(12) United States Patent
Mullenaux et al.

(10) Patent No.: US 11,919,764 B2
(45) Date of Patent: Mar. 5, 2024

(54) VEHICULAR WATER PROCESSING AND FILLING SYSTEM

(71) Applicant: AQUAPHANT INC., Las Vegas, NV (US)

(72) Inventors: Thomas Cody Mullenaux, San Pedro, CA (US); Mark W. J. Kelly, Laguna Beach, CA (US)

(73) Assignee: AQUAPHANT INC., Las Vegas, NV (US)

(*) Notice: Subject to any disclaimer, the term of this patent is extended or adjusted under 35 U.S.C. 154(b) by 0 days.

(21) Appl. No.: 17/647,837

(22) Filed: Jan. 12, 2022

(65) Prior Publication Data

US 2022/0259032 A1 Aug. 18, 2022

Related U.S. Application Data

(63) Continuation-in-part of application No. 17/451,131, filed on Oct. 15, 2021, which is a continuation-in-part
(Continued)

(51) Int. Cl.
*B67D 1/08* (2006.01)
*B01D 5/00* (2006.01)
(Continued)

(52) U.S. Cl.
CPC .......... *B67D 1/0888* (2013.01); *B01D 5/009* (2013.01); *B01D 53/265* (2013.01); *B60R 16/08* (2013.01); *B67D 1/0004* (2013.01); *E03B 3/28* (2013.01)

(58) Field of Classification Search
CPC ....... A47J 31/46; A47J 31/465; B01D 53/265; B01D 5/009; B01D 2202/00; E03B 3/00;
(Continued)

(56) References Cited

U.S. PATENT DOCUMENTS

| 6,076,706 A * | 6/2000 | Kritchman | B60H 1/00285 |
| | | | 222/481.5 |
| 6,182,453 B1 * | 2/2001 | Forsberg | C02F 1/008 |
| | | | 62/285 |

(Continued)

FOREIGN PATENT DOCUMENTS

| GB | 2583546 A | * 11/2020 | B67D 1/0008 |
| WO | WO-2020170243 A1 | * 8/2020 | B01D 5/0075 |

OTHER PUBLICATIONS

Watergen—Creating Water From Air—Live Demo; Youtube—https://www.youtube.com/watch?v=cDxUyb2uQUY; May 17, 2021.
(Continued)

*Primary Examiner* — Timothy L Maust
(74) *Attorney, Agent, or Firm* — SHIMOKAJI IP

(57) ABSTRACT

A vehicular water processing and filling system includes a vehicular processing assembly configured to obtain and transport water; a vehicular filling assembly configured to receive water from the processing assembly; and a controller configured to: identify a presence of a container operatively adjacent to the filling assembly; determine whether an RFID tag on the container is valid; and if the RFID tag is valid, activate a flow of water from the filling assembly and into the container; wherein the processing assembly, the filling assembly, and the controller are configured to be disposed in one of a first compartmental area and a second compartmental area of a vehicle.

4 Claims, 11 Drawing Sheets

Related U.S. Application Data of application No. 17/380,178, filed on Jul. 20, 2021, now Pat. No. 11,738,986, which is a continuation-in-part of application No. 17/176,350, filed on Feb. 16, 2021, now Pat. No. 11,672,367.

(51) Int. Cl.
 *B01D 53/26* (2006.01)
 *B60R 16/08* (2006.01)
 *B67D 1/00* (2006.01)
 *E03B 3/28* (2006.01)

(58) Field of Classification Search
 CPC .. E03B 3/28; E03B 11/00; B67D 3/00; B67D 7/00; B67D 1/0008
 See application file for complete search history.

(56) References Cited

U.S. PATENT DOCUMENTS

| | | | | |
|---|---|---|---|---|
| 6,237,352 | B1* | 5/2001 | Goodchild | B01D 5/0072 62/93 |
| 6,684,648 | B2* | 2/2004 | Faqih | E03B 3/28 62/93 |
| 6,755,037 | B2* | 6/2004 | Engel | E03B 3/28 62/177 |
| 7,089,763 | B2* | 8/2006 | Forsberg | F24F 1/027 62/635 |
| 7,540,167 | B2* | 6/2009 | Murphy | B01D 5/0039 62/291 |
| 8,151,832 | B1* | 4/2012 | Dorney | G07F 9/001 141/94 |
| 8,176,948 | B2* | 5/2012 | Carrig | H04W 4/08 141/82 |
| 8,252,174 | B2* | 8/2012 | Jones | C02F 1/048 62/181 |
| 8,261,780 | B2* | 9/2012 | Thomas | H01Q 1/2233 141/105 |
| 8,359,877 | B2* | 1/2013 | Kamen | B67D 1/0888 62/291 |
| 8,950,447 | B2* | 2/2015 | De Rosa | B05B 11/0038 141/285 |
| 9,212,041 | B2* | 12/2015 | Keating | B67D 3/0058 |
| 9,517,923 | B2* | 12/2016 | Al-Hakim | B67D 1/10 |
| 9,561,451 | B2* | 2/2017 | Dorfman | E03B 3/28 |
| 9,795,895 | B2* | 10/2017 | Dorfman | E03B 3/28 |
| 10,480,163 | B2* | 11/2019 | Dudar | B60N 3/16 |
| 10,513,213 | B1 | 12/2019 | Mullenaux | |
| 10,562,749 | B2* | 2/2020 | Chivchyan | B67D 3/0009 |
| 10,570,004 | B2* | 2/2020 | Gatipon | B67D 1/0888 |
| 10,710,863 | B2* | 7/2020 | Casci | B67D 1/10 |
| 10,994,978 | B1 | 5/2021 | Mullenaux | |
| 2006/0165060 | A1* | 7/2006 | Dua | G06Q 20/401 705/76 |
| 2010/0025311 | A1* | 2/2010 | Jones | C02F 1/048 222/173 |
| 2011/0147194 | A1* | 6/2011 | Kamen | B01D 5/0006 202/262 |
| 2012/0221198 | A1 | 8/2012 | Water-Gen | |
| 2016/0096716 | A1* | 4/2016 | Al-Hakim | B67D 1/0004 141/113 |
| 2016/0333553 | A1* | 11/2016 | Dorfman | C02F 1/78 |
| 2021/0108396 | A1* | 4/2021 | Bromley | H01M 10/425 |
| 2021/0283529 | A1 | 9/2021 | Aquaphant | |

OTHER PUBLICATIONS

Watergen; https://us.watergen.com/mobility/; Jan. 11, 2022.

\* cited by examiner

VEHICULAR WATER PROCESSING AND FILLING SYSTEM

CROSS-REFERENCE TO RELATED APPLICATIONS

This application is a continuation-in-part of, and claims priority to and the benefit of, U.S. patent application Ser. No. 17/451,131, filed Oct. 15, 2021; which is a continuation-in-part of U.S. patent application Ser. No. 17/380,178, filed Jul. 20, 2021; which is a continuation-in-part of U.S. patent application Ser. No. 17/176,350, filed Feb. 16, 2021, all of which are incorporated herein in their entirety.

BACKGROUND OF THE DISCLOSURE

The present disclosure generally relates to water systems and, more particularly, to apparatus and methods of processing and filling water into a container.

Consumers often avoid drinking water from the tap. Accordingly, consumers frequently purchase pre-filled bottles of water. The bottles are often made of plastic and discarded after a single use. That contributes to environmental waste which does not quickly degrade. Also, the consumer has to travel to a store to purchase more plastic bottles of water.

When the consumer is in a rented space, such as a hotel room or even vehicle, bottled water is often provided for a charge. However, the owner of the space may need to constantly replenish the bottles of water and discard the used bottles. At the same time, the owner may need to track the number of consumed bottles of water and charge the consumer accordingly.

As can be seen, there is a need for improved apparatus and methods to process, fill, and dispense water.

SUMMARY OF THE DISCLOSURE

In one aspect of the present disclosure, a vehicular water processing and filling system comprises a processing assembly configured to obtain and transport water; wherein the processing assembly is further configured to be disposed in one of a first compartmental area and a second compartmental area of a vehicle; a filling assembly configured to receive water from the processing assembly; wherein the filling assembly is further configured to be disposed in one of the first and the second compartmental areas of the vehicle; and a controller configured to: identify a presence of a container operatively adjacent to the filling assembly; determine whether an RFID tag on the container is valid; and if the RFID tag is valid, activate a flow of water from the filling assembly and into the container; wherein the controller is further configured to be disposed in one of the first and the second compartmental areas of the vehicle.

In another aspect of the present disclosure, a vehicular water processing and filling system comprises a processing assembly configured to condense water from an environment outside of the system; wherein the processing assembly is further configured to be disposed in one of a first compartmental area and a second compartmental area of a vehicle; a filling assembly configured to receive water from the processing assembly; wherein the filling assembly is further configured to be disposed in one of the first and the second compartmental areas of the vehicle; and a controller configured to: identify an identity of a container operatively adjacent to the filling assembly; obtain physical characteristics of the container according to the identity of the container; compare a weight of the container to a weight range; and activate a flow of water from the filling assembly and into the container; wherein the controller is further configured to be disposed in one of the first and the second compartmental areas of the vehicle.

In a further aspect of the present disclosure, a vehicular water processing and filling system for a vehicle, wherein the vehicle includes a plurality of compartmental areas having at least a cargo area and a passenger area; wherein the plurality of compartmental areas includes a plurality of interior support structures having at least a floor, a dashboard and a console, the system comprises a processing assembly configured to dehumidify water from air outside of the system; wherein the processing assembly is further configured to be disposed in or on a first interior support structure of the vehicle; a filling assembly configured to receive water from the processing assembly; wherein the filling assembly is further configured to be disposed in or on one of the first interior support structure and a second interior support structure of the vehicle; and a controller configured to: identify a presence of a container operatively adjacent to the filling assembly; determine whether an RFID tag on the container is valid; and if the RFID tag is valid, activate a flow of water from the filling assembly and into the container; wherein the controller is further configured to be disposed in or on one of the first interior support structure, the second interior support structure and a third interior support structure of the vehicle.

These and other features, aspects and advantages of the present disclosure will become better understood with reference to the following drawings, description, and claims.

DETAILED DESCRIPTION OF THE DISCLOSURE

Figure 1:
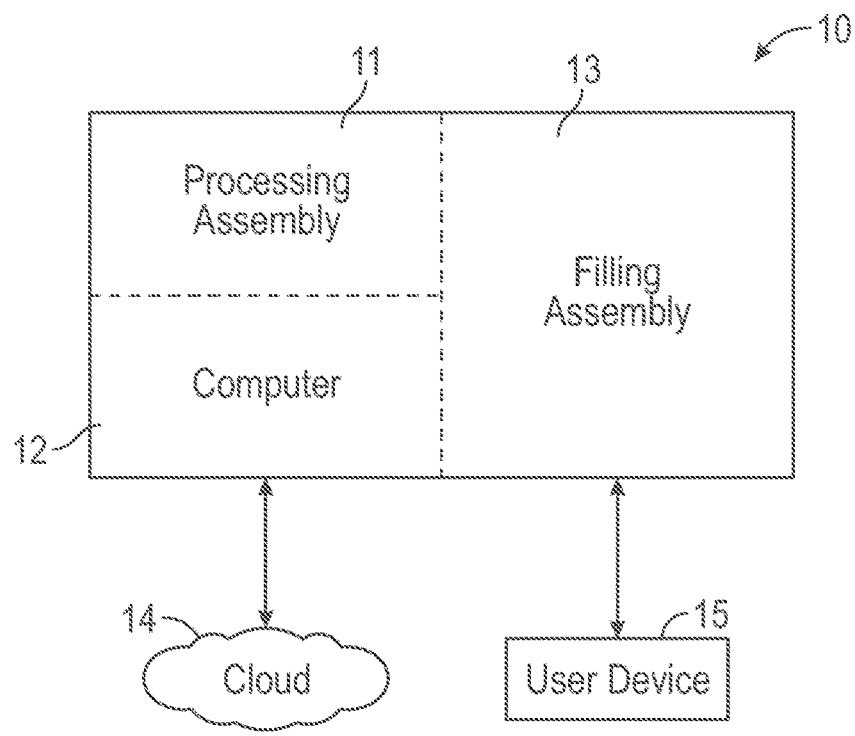
FIG. 1 is a schematic diagram of a vehicular water processing and filling system according to an embodiment of the present disclosure.

The following detailed description is of the best currently contemplated modes of carrying out the disclosure. The description is not to be taken in a limiting sense, but it is merely for the purpose of illustrating the general principles of the disclosure, since the scope of the disclosure is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As used herein, the terms "embodiment" and "embodiments" are intended to be used interchangeably. In other words, the singular includes the plural, and vice versa.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "assembly," or "system". Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Broadly, the present disclosure provides apparatus and methods for processing, filling and dispensing water for a vehicle, such as a land-based or water-based vehicle, including an electric car. In the present disclosure, water may be condensed from humidified air, and filtered. The present disclosure may determine—via an RFID tag—whether a container (e.g., bottle) is valid. If valid, and based on stored characteristics of the container, the present disclosure fills the container with water. The present disclosure may enable a user to have an account which can be monetarily charged each time a container is filled.

FIG. 1 is a schematic diagram of an exemplary embodiment of a vehicular water processing and filling system 10. In an embodiment, all or a part of the system 10 may be configured to be disposed/mounted inside and/or outside of a vehicle. In an embodiment, the system 10 may include a vehicular processing assembly 11 which operatively communicates with a vehicular filling assembly 13 and with a vehicular computer 12 (i.e., a CPU/processor/controller/database). In an embodiment, the computer 12 may be separate from the processing assembly 11 and separate from the filling assembly 13. Or, in an embodiment, the computer 12 may be a part of the processing assembly 11 or a part of the filling assembly 13. In an embodiment, the computer 12 may store information in a cloud 14, or locally. In an embodiment, the computer 12 may be configured to be disposed/mounted in a compartmental area of a vehicle, as described below.

According to an embodiment, a vehicular user device 15—such as a desktop, a laptop, mobile phone, or on-board vehicle computer—may communicate with the system 10—wirelessly or wired. For example, the user device 15 may initiate a start of the processing assembly 11, initiate a start of the filling assembly, and/or initiate a creation of a user account as further described below. In an embodiment, the user device 15 may be configured to be disposed/mounted in a compartmental area of a vehicle, as described below. In an embodiment, the user device 15 may be configured to be disposed in/on an interior support structure in a compartmental area of a vehicle, as described below.

In an embodiment, the processing assembly 11 may be configured to be disposed/mounted in a compartmental area of a vehicle, as described below. In an embodiment, the processing assembly 11 may be configured to be disposed in/on an interior support structure in a compartmental area of a vehicle, as described below. The processing assembly 11 may, in an embodiment, be configured to acquire humidified air from an environment outside of the system 10, such as the air inside and/or outside of a vehicle. The processing assembly 11 may be further configured to condense water from the humidified air (i.e., dehumidify the humidified air). According to an embodiment, the processing assembly 11 may also be configured to filter the humidified air and/or filter the condensed water. In an embodiment, the processing assembly 11 may be further configured to pump the condensed water to the filling assembly 13.

In an embodiment, the filling assembly 13 may receive condensed (i.e., dehumidified) water from the processing assembly 11. The filling assembly 13 may read an ID tag on the container to determine whether it is valid or not. If valid, according to an embodiment, the filling assembly 13 may then use stored characteristics of the container to fill the container with water.

Figure 2:
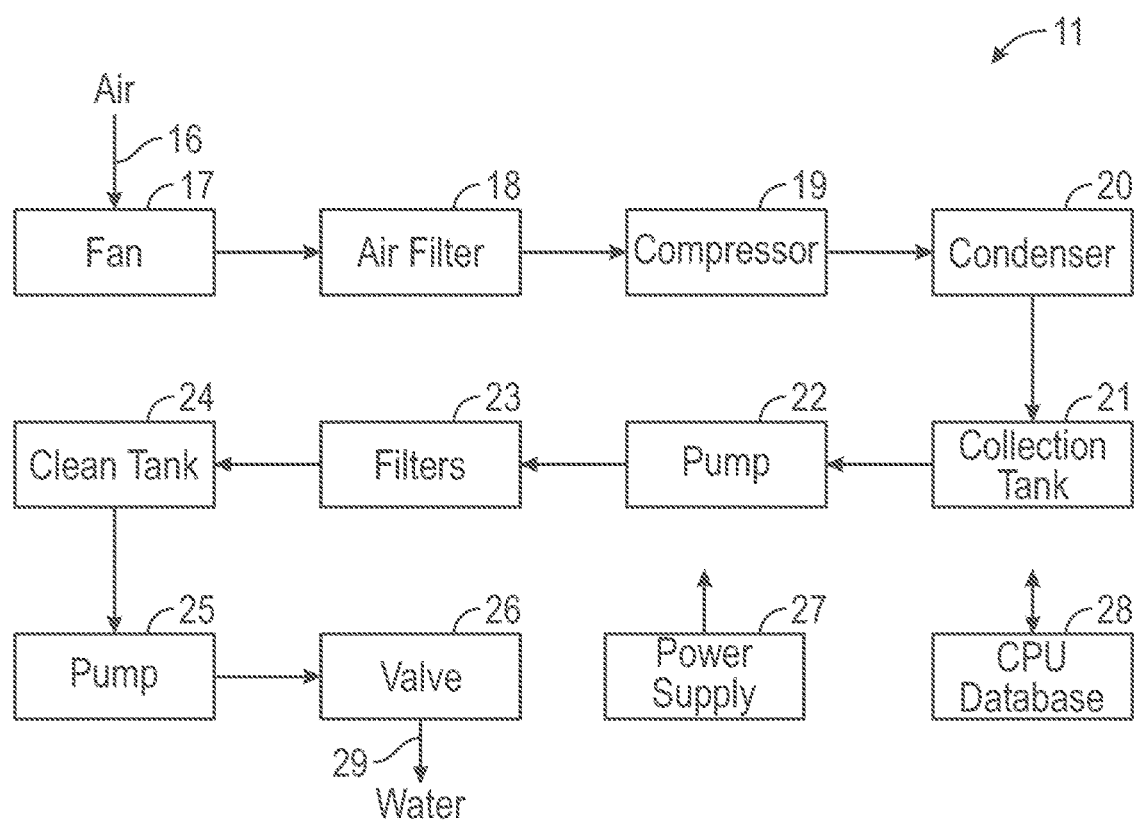
FIG. 2 is a schematic diagram of a vehicular processing assembly according to an embodiment of the present disclosure.

FIG. 2 is a schematic diagram of an exemplary embodiment of the processing assembly 11. The processing assembly 11 may, in an embodiment, have a fan 17 that draws in humidified air 16 from an environment outside of the processing assembly 11. The humidified air 16 may then pass through an air filter 18 to remove contaminants and/or particulates to produced filtered air 16, according to an embodiment. From the air filter 18, the filtered air 16 may be compressed in a compressor 19 and then moisture in the filtered air 16 may be removed by a condenser 20, in embodiments, to produce condensed water. The compressor 19 and the condenser 20 may, in combination, be a dehumidifier that can produce condensed water.

In embodiments of the processing assembly 11, the condensed water may be collected in a collection tank 21. From the collection tank 21, a pump 22 may pump the condensed water through filters 23 to remove particulates and/or contaminants, for example. The filtered water from the filters 23 may move into a clean tank 24, according to an embodiment. A pump 25 may then pump the filtered water from the clean tank 24 and through a valve 26 to produce a drinking water 29, in an embodiment. From the valve 26, the drinking water 29 may be transferred to the filling assembly 13.

The processing assembly 11 may, in embodiments, include a power supply 27 that may supply power to one or more of the components in the processing assembly 11, such as the fan 17, the compressor 19, the condenser 20, or the pumps 22, 25. In embodiments, the processing assembly 11 may also include a computer 28 (i.e., CPU/processor/controller/database) to communicate with and control the operation of one or more of the components in the assembly 11. In another embodiment, the computer 12 may communicate with and control the operation of one or more of the components in the assembly 11. In an embodiment, the computers 12, 28 may store information in the cloud 14, or locally.

In embodiments, the computer/controller 12, 28 may be configured to determine whether the collection tank 21 is empty (e.g., via a sensor in the tank 21) and/or to start/stop operation of one or more of the components in the processing assembly 11.

Figure 3:
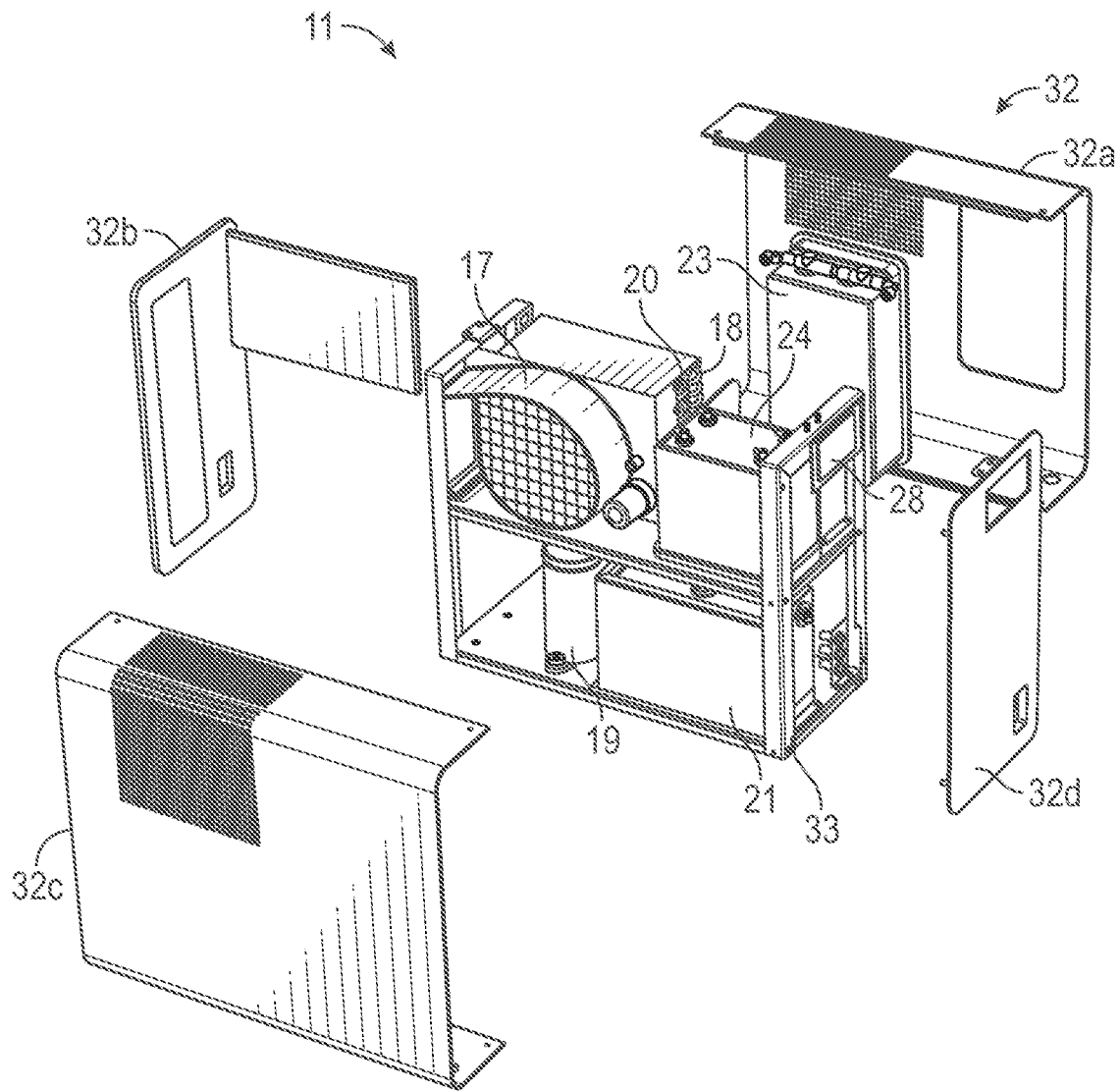
FIG. 3 is a partially exploded view of a vehicular processing assembly according to an embodiment of the present disclosure.

FIG. 3 is a partial exploded view of a processing assembly 11 according to an exemplary embodiment. Reference numbers that are the same in FIG. 3 and FIG. 2 are intended to represent like components, and their descriptions are not repeated here for the sake of brevity.

In FIG. 3, in an embodiment, the processing assembly 11 may include a housing 32. The housing 32 may, in embodiments, include a plurality of housing parts 32a, 32b, 32c, 32d. Within the housing 32 may be a frame 33 which can support one or more of the components of the processing assembly 11.

Figure 4:
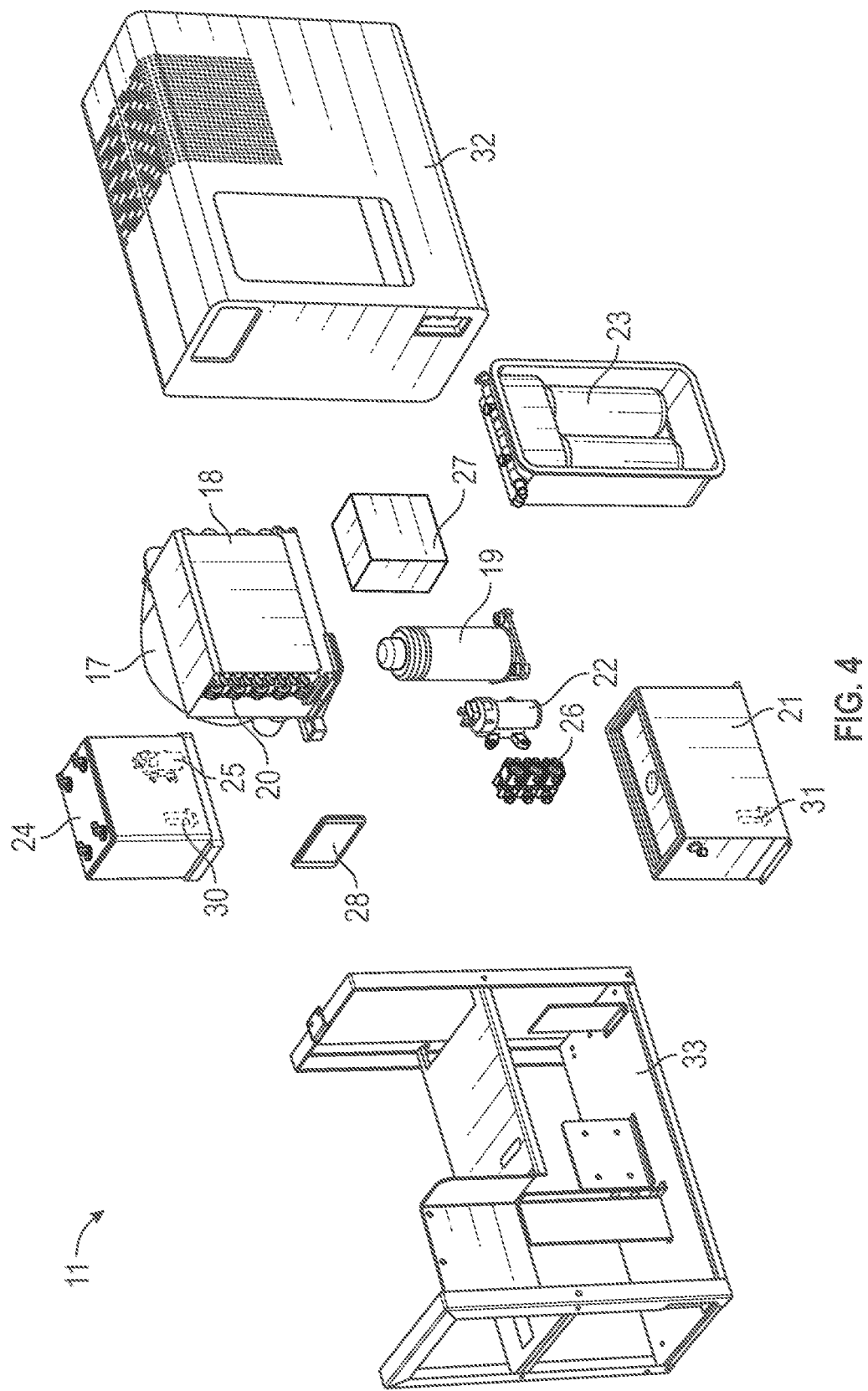
FIG. 4 is another partially exploded view of a vehicular processing assembly according to an embodiment of the present disclosure.

FIG. 4 is another partially exploded view of a processing assembly 11 according to an exemplary embodiment. Reference numbers that are the same in FIG. 4, FIG. 3, and FIG. 2 are intended to represent like components, and their descriptions are not repeated here for the sake of brevity.

In FIG. 4, according to an embodiment, the clean tank 24 may include a UV-LED 30 which may destroy bacteria and the like in the water that resides in the clean tank 24. Similarly, in an embodiment, the collection tank 21 may include a UV-LED 31 which may destroy bacteria and the like in the water that resides in the collection tank 21.

Figure 5:
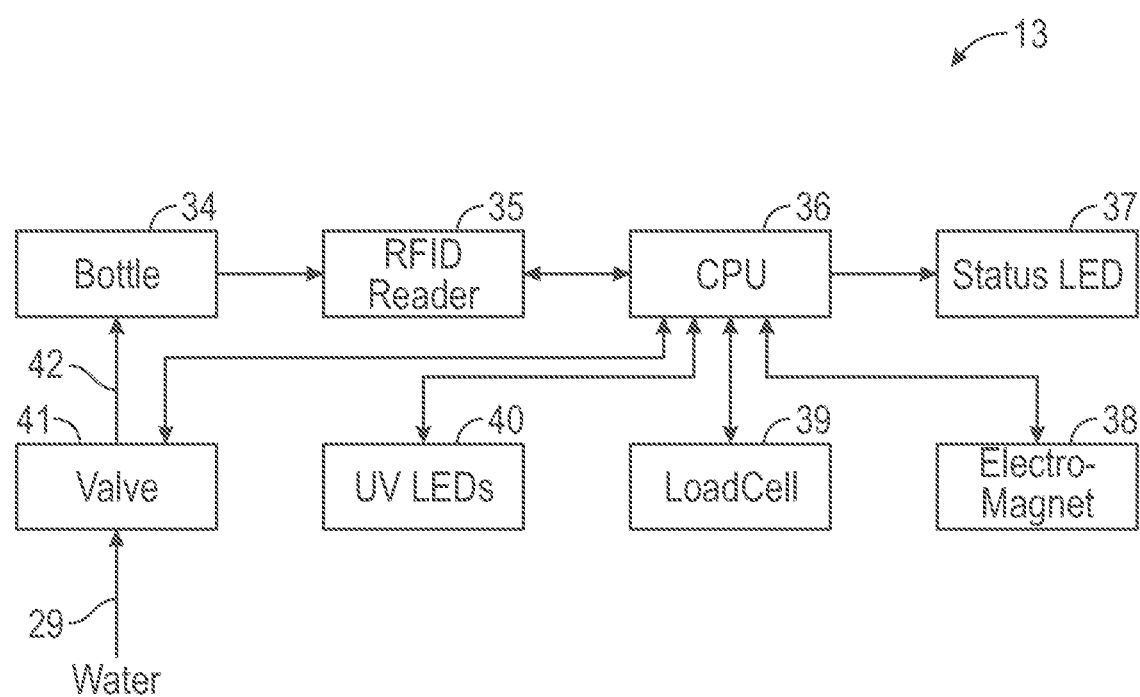
FIG. 5 is a schematic diagram of a vehicular filling assembly according to an embodiment of the present disclosure.

FIG. 5 is a schematic diagram of an exemplary embodiment of the filling assembly 13. In an embodiment, the filling assembly 13 may be configured to be disposed/mounted in a compartmental area of a vehicle, as described below. In an embodiment, the filling assembly 13 may be configured to be disposed/mounted in/on an interior structural component in a compartmental area of a vehicle, as described below.

In embodiments, the filling assembly 13 may have an RFID reader 35 that may read an RFID tag on a container 34 to be filled with water. In an embodiment, an electromagnet 38 may hold the container 34 in a position to be filled with water. A status LED 37 may indicate the operational state of the filling assembly 13. The filling assembly 13 may further include a load cell 39 that may weigh a container 34 that is empty or full of water or partially full of water. A UV-LED 40 may be included in the filling assembly 13, in an embodiment, and which can destroy bacteria and the like before water enters the container 34. In an embodiment, a valve 41 may receive water 29 from the processing assembly 11 and direct water 42 into the container 34.

In the filling assembly 13, according to an embodiment, a computer 36 (i.e., CPU/processor/controller/database) may communicate with and control one or more of the other components in the filling assembly 13. In another embodiment, the computer 12 may communicate with and control one or more of the components in the filling assembly 13. In an embodiment, the computers 12, 36 may store information in the cloud 14, or locally.

Figure 6:
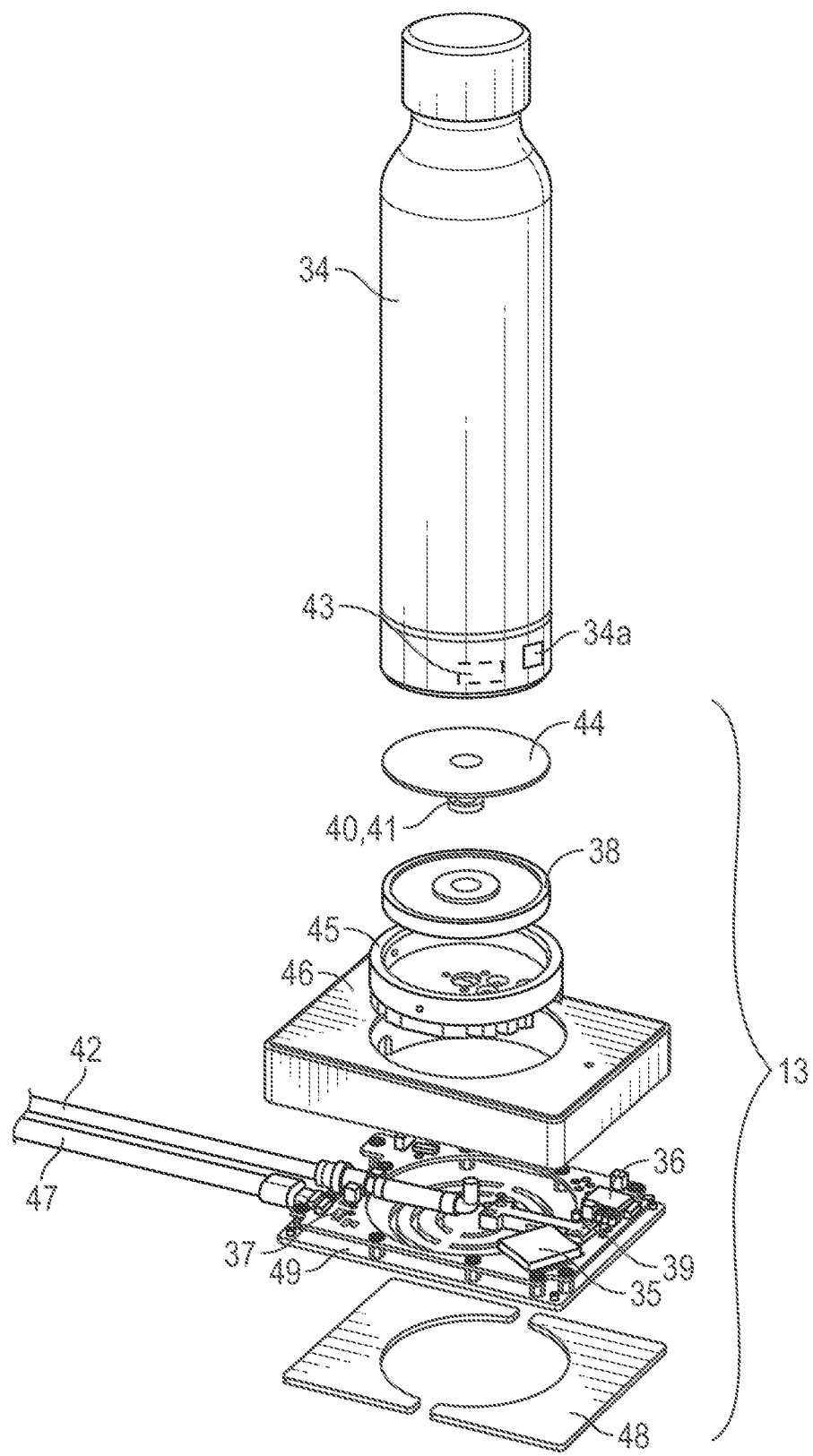
FIG. 6 is an exploded view of a filling assembly according to an embodiment of the present disclosure.

FIG. 6 is an exploded view of a filling assembly 13, according to an exemplary embodiment, and which is operatively adjacent to a container 34. Reference numbers that are the same in FIG. 6 and FIG. 5 are intended to represent like components, and their descriptions are not repeated here for the sake of brevity.

The filling assembly 13 may include a cover 44 having an aperture therein, wherein the cover 44 can be positioned operatively adjacent the container 34 to be filled with water, according to an embodiment. At the aperture can be a UV-LED 40 and a valve 41, in an embodiment. At a side of the cover 44, which is opposite another side of the cover where the container 34 is positioned, can be an electromagnet 38. The electromagnet may hold the container 34 in a fill position, in an embodiment.

In an embodiment, the filling assembly 13 may further include a container holder 45 which can be at a side of the electromagnet 38 opposite another side of the electromagnet 38 where the cover 44 is positioned. According to an embodiment, the container holder 45 may support the container 34 in a fill position. In an embodiment, a housing 46 may house the cover 44, the electromagnet 38, and the container holder 45.

In embodiments, the filling assembly 13 can also include a bottom base plate 48 that can support an upper base plate 49. The base plate 49 may, in an embodiment, support an RFID reader/sensor 35, a CPU/controller 36, a status LED 37, a load cell 39, a water supply 42, and a USB cable 47. The RFID reader/sensor 35 may read/sense an RFID tag 42 on the container 34. The status LED may indicate the operational state of the filling assembly 13. The load cell 39 may determine a weight of the container 34. The water supply 42 may supply water through the valve 41 and into the container 34 via a one-way valve 43 in a bottom of the container 34.

In the filling assembly 13, according to an embodiment, the computers 12 and/or 36 (i.e., the controllers) may be configured to identify a presence of a container 34 operatively adjacent the filling assembly 13 (such as by reading RFID sensor 35 when the user moves the container 34 over or near the filling assembly 13), determine whether an RFID tag 34a on the container 34 is valid (such as by checking a database of valid RFID tags), and if the RFID tag is valid, activate a flow of water 42 from the filling assembly 13 and into the container 34. The controllers 12 and/or 36 may be further configured to obtain physical characteristics of the container 34 (such as by checking a database of physical characteristics of containers having valid RFID tags), display instructions on a user device 15, initiate a reading of a weight of the container 34, determine whether a weight of the container 34 is in a valid weight range (such as by checking a database of valid weight ranges of valid containers), and determine whether the container 34 is full of water 42 (such as by checking a database of weights of full containers).

In another embodiment, in the filling assembly 13, the controllers 12 and/or 36 may be configured to identify an identity of a container 34 operatively adjacent the filling assembly 13 (such as by checking a database of valid RFID tags and their associated containers), obtain physical characteristics of the container 34 according to the identity of the container 34, compare a weight of the container 34 to a weight range, and activate a flow of water 42 from the filling assembly 13 and into the container 34.

In an embodiment, data relating to container identity, container physical characteristics, and container weight range may be stored in the database 12, in the cloud 14, or locally. In an embodiment, identity data may be data that relates a specific (i.e., valid) container 34 to a valid (i.e., authorized) user account. In an embodiment, physical characteristic data may relate to a type of the container, a size of the container, a volume capacity of the container, and/or an empty weight and/or a filled weight of a valid container associated with a valid user account. In an embodiment, weight range date may be data of a range of weights for a valid container—empty and filled.

In the foregoing embodiment, the controllers 12 and/or 36 may be further configured to identify a presence of the container 34 operatively adjacent to the filling assembly 13, determine whether an RFID tag 34a is valid, cause a load cell 39 to measure a weight of the container 34, compare the weight of the container with a valid weight range, and activate a valve 41 in the filling assembly 13.

In a further embodiment, in the filling assembly 13, the controllers 12 and/or 36 may be configured to determine whether an RFID tag 34a on a container 34 at the filling assembly 13 is valid, determine if there is a valid user account associated with the RFID tag, enable a valid user to purchase a fill of water, and initiate the filling assembly 13 to fill water 42 into the container 34.

In the foregoing embodiment, the controllers 12 and/or 36 may be further configured to determine whether the system 10 is available to dispense water, identify a presence of the container 34 at the filling assembly 13, enable an invalid user to set up an account, process a purchase against an account of the valid user, disable the container 34 in an account of the valid user, and provide a receipt of the purchase to the valid user.

Figure 7A:
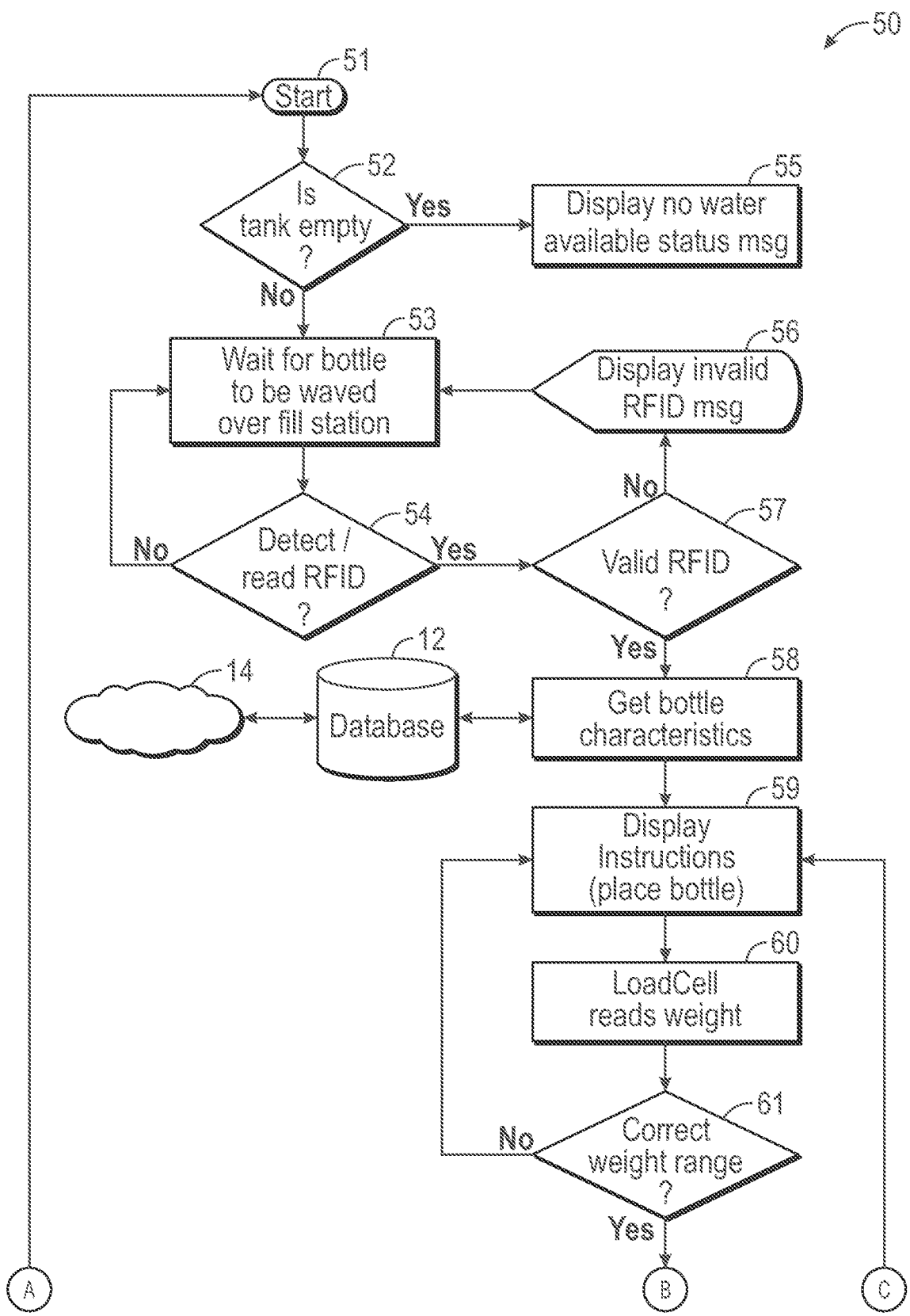
FIGS. 7A-7B are flow charts of a vehicular filling process according to an embodiment of the present disclosure.
Figure 7B:
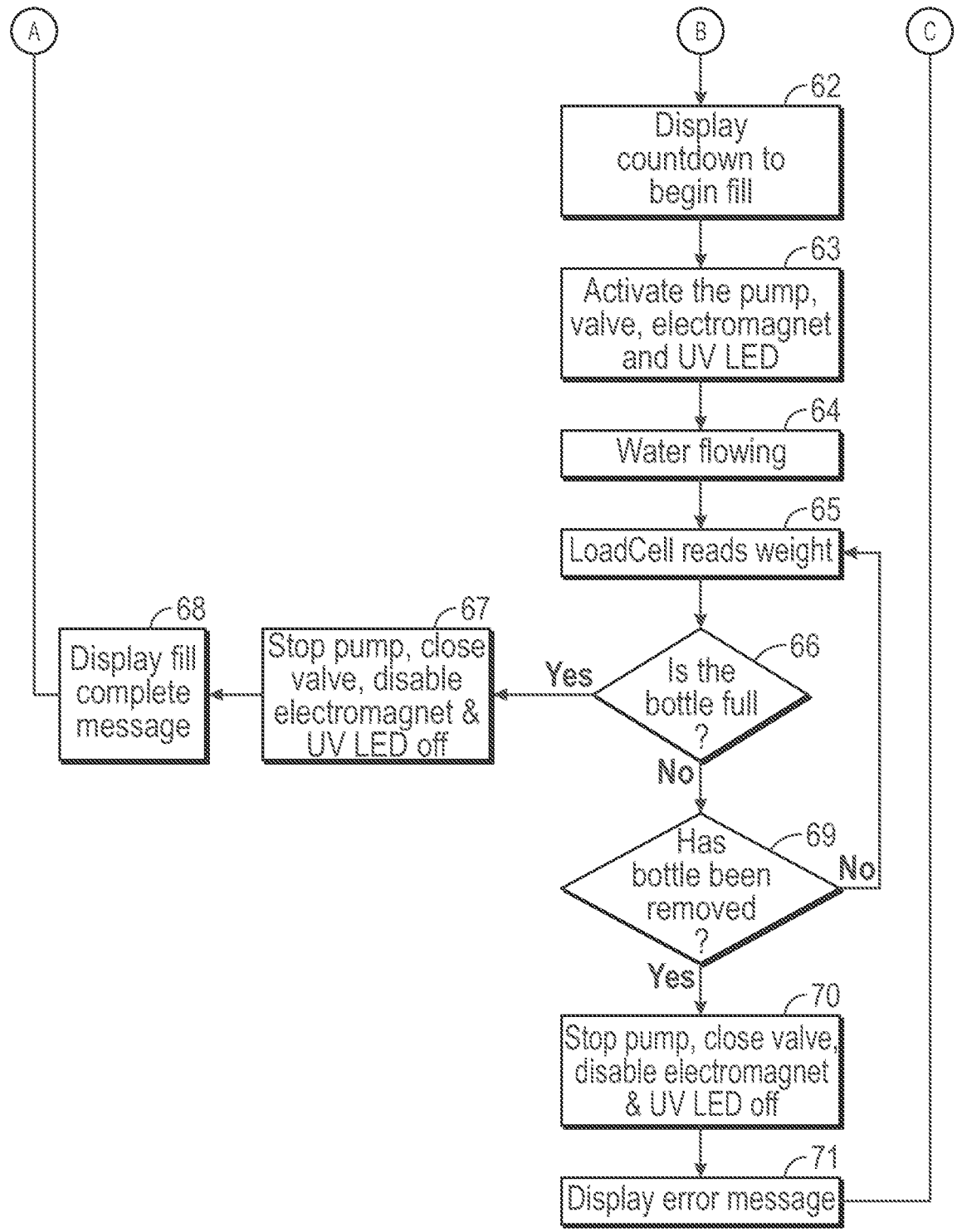

FIGS. 7A-7B are flow charts of a filling process 50 according to an exemplary embodiment of the present disclosure.

At block 51, the system 10 can be powered on (such as by a power switch in the processing assembly 11). At block 52, determine whether the collection tank 21 is empty (such as by a sensor in the tank 21). If yes, then at block 55, display a "no water available" message on the user device 15. If no, then at block 53, wait for a container 34 to be operatively adjacent to the filling assembly 13.

At block 54, detect and read an RFID tag 42 on the container 34. If none detected, return to block 53. If detected, then at block 57, determine whether the RFID tag is valid (such as from a database of valid RFID tags). If not valid, at block 56, display an "invalid" message on the user device. If valid, at block 58, obtain physical characteristics of the container 34 (such as from a database of physical characteristics associated with valid RFID tags). The foregoing database(s) may be the database 12 and/or cloud 14 and/or the database 36.

Following block 58, at block 59, display "place container in holder" message on the user device. At block 60, the load cell 39 measures the weight of the container 34. At block 61, compare measured weight against valid weight ranges (such as from a database 12, 14, and/or 36 of valid weight ranges associated with valid RFID tags/valid containers). If not valid, then return to block 59. If valid, start countdown to start of filling water. At block 63, activate the pump 25, the valve 26, the electromagnet(s) 38, and the UV-LED 40. At block 64, water is flowing from the processing assembly 11 and into the filling assembly 13.

At block 65, the load cell 39 measures the weight of the container 34. At block 66, determine whether the container 34 is full of water by comparing an empty weight to a full weight (such as from a database 12, 14 and/or 36 of full weights of valid containers). If yes, then at block 67, stop the pump 25, close the valve 26, disable the electromagnet (s) 38, and turn off the UV-LED 40. At block 68, display "fill complete" message on the user device, and then return to the start 51. If not full, then at block 69, determine whether the container 34 has been removed from the filling assembly 13 (such as by a sudden change in the reading from the load cell 39).

In an embodiment, a "sudden change" may be as follows. The load cell 39 may continually monitor the weight of the container 34 during the filling process. As the filling process is somewhat linear, the expected weight change can be determined and monitored while filling. The weight readings can occur about 30-35 times a second. If, during the filling process, there is a different result, the controller 12 and/or 36 can note a "bad" reading, starting a process that will check for up to two more bad readings in succession. If this occurs, the controller 12 and/or 36 can assume that something has gone wrong and can stop the filling process by closing the valve 26 and switching off the pump 25. If the bad readings do not reach the three-result threshold, the controller 12 and/or 36 can reset and continue as normal.

If the container 34 has not been removed, then return to block 65, If yes, then stop pump 25, close the valve 26, disable the electromagnet(s) 38, and turn off the UV-LED 40. Next, at block 71, display "error" message on the user device, and return to block 59.

Figure 8A:
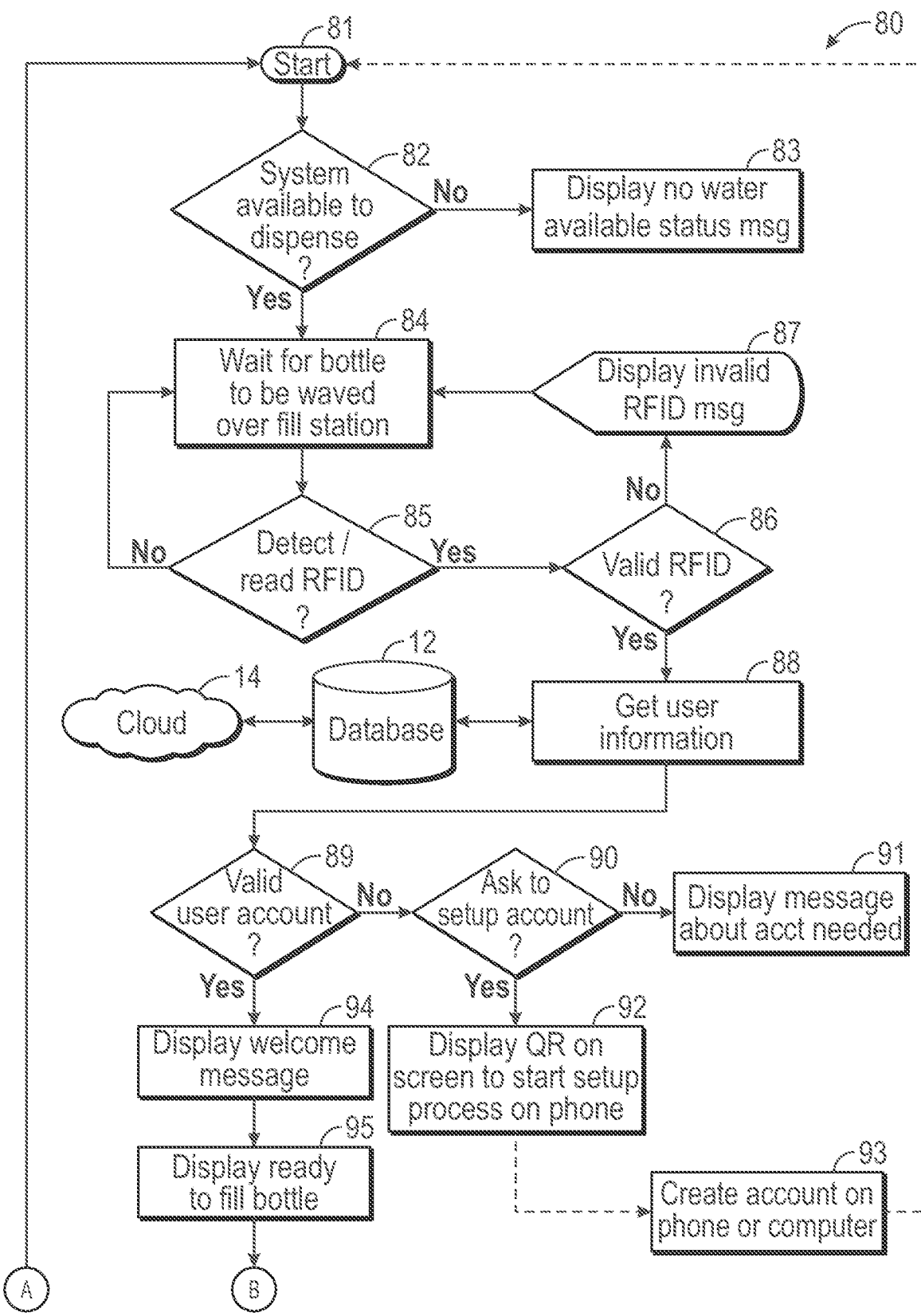
FIGS. 8A-8B are flow charts of a vehicular monetization process according to an embodiment of the present disclosure.
Figure 8B:
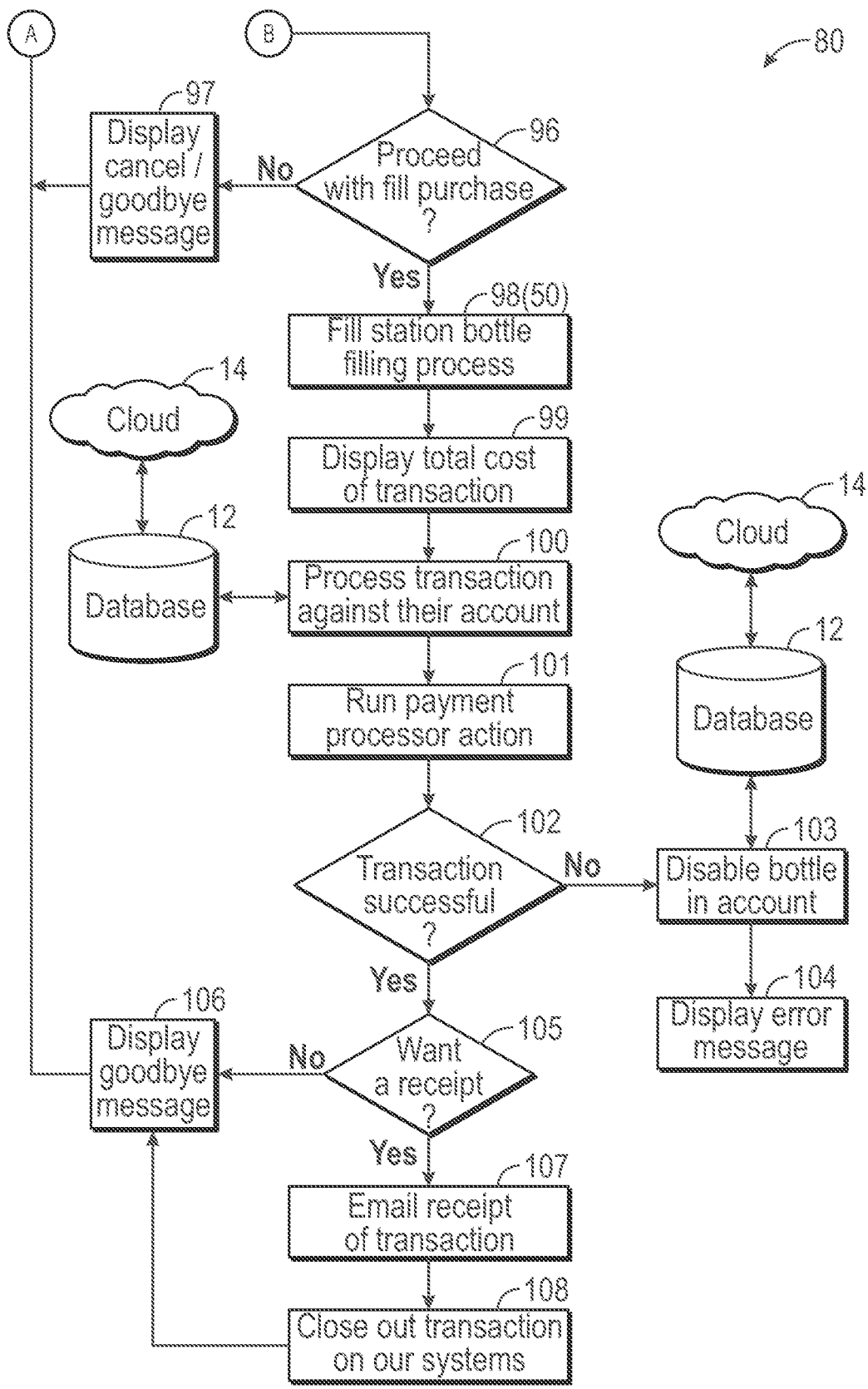

FIGS. 8A-8B are flow charts of a monetization process 80 according to an exemplary embodiment of the present disclosure.

At block 81, the system 10 can be powered on (such as by a power switch in the processing assembly 11). At block 82, determine whether the system 10 is available to dispense water to third persons (such as by reading the setting in the database 12 and/or 36 and/or cloud 14 of the users the owner wishes to allow water to be available). If no, then at block 83, display a "no water available" message on the user device. If yes, then at block 84, wait for a container 34 to be operatively adjacent to the filling assembly 13.

At block 85, detect and read an RFID tag 34a on the container 34. If none detected, return to block 84. If detected, then at block 86, determine whether the RFID tag is valid (such as from a database of valid RFID tags). If not valid, at block 87, display an "invalid" message on the user device. If valid, at block 89, obtain user information (such as from a database of user information associated with valid RFID tags). The foregoing database(s) may be the database 12 and/or cloud 14 and/or the database 36.

At block 89, determine whether the user has a valid user account (such as from a database of valid user accounts associated with users). If no valid user account, at block 90, display message "set up account?" on the user device. If no, at block 91, display message "account needed" on the user device. If yes, at block 92, display screen to start set up process with user device 15.

At block 89, if yes to having a valid user account, then at block 94, display message "welcome" on the user device. Then at block 95, display message "ready to fill bottle" on the user device. At block 96, display message "proceed to purchase?" on the user device. If no, then at block 97, display message "cancel/goodbye" on the user device, and the process returns to block 81. If yes, then at block 98, the bottle filling process starts (such as that described in process 50).

At block 99, display message of total cost of purchase on the user device. At block 100, process the purchase against the valid user account. At block 101, run payment processor action. At block 102, determine if purchase is successful? If no, at block 103, disable bottle in user account and then at block 104, display message "error" on the user device.

If purchase is successful, at block 105, display message "want a receipt" on the user device. If no, at block 106, display message "goodbye" on the user device and return to block 81. If yes, at block 107, email receipt of purchase to user In embodiments, blocks 99 through 107 may be implemented by any suitable e-commerce program that enables a user to purchase a product/service online.

At block 108, close out transaction in any suitable accounting system that can remote from the system 10, and then continue to blocks 106 and 81.

Figure 9:
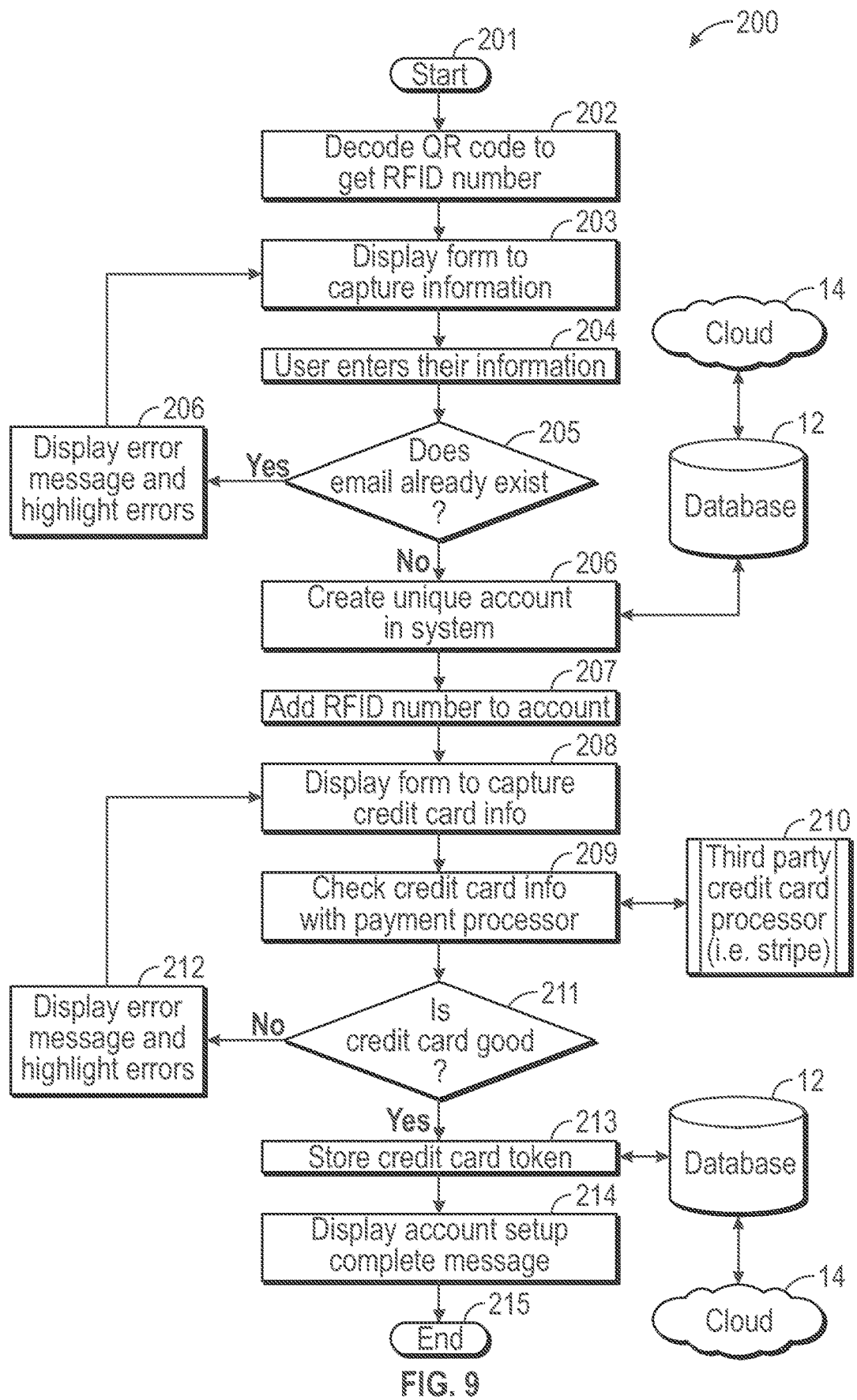
FIG. 9 is a flow chart of a vehicular user account setup process according to an embodiment of the present disclosure.

FIG. 9 is a flow chart of a user account setup process 200 according to an embodiment of the present disclosure.

In an embodiment, the setup process 200 may be implemented in the monetization process 80. In an embodiment, the setup process may be implemented following block 90 of the monetization process 80.

In an embodiment, at block 201, the user device 15, such as a mobile phone, may download a mobile app to access the process 200. At block 202, the user device 15 decodes a QR code from the computer 12 and/or 28 and/or 36 to get an RFID number. At block 203, display a form on the user device 15 to capture user information. At block 204, user enters information. At block 205, determine if user email already exists in the database 12 and/or 28 and/or 36 and/or cloud 14. If yes, at block 206, display error message and return to block 203. If no, create unique account in the database.

At block 207, add RFID number from above to account. At block 208, display a form on the user device to capture credit card information. At block 209, verify credit card information with payment processor. At block 210, credit card processor uses credit card stripe. At block 211, is credit card good? If no, at block 212, display error message and then return to block 208. If yes, at block store credit card token in the database 12 and/or 28 and/or 36 and/or cloud 14. At block 214, display message that setup is complete and, at block 215, end process, such as by continuing in the monetization process 80. In an embodiment, the process 200 may continue at block 94 of the monetization process 80.

Figure 10:
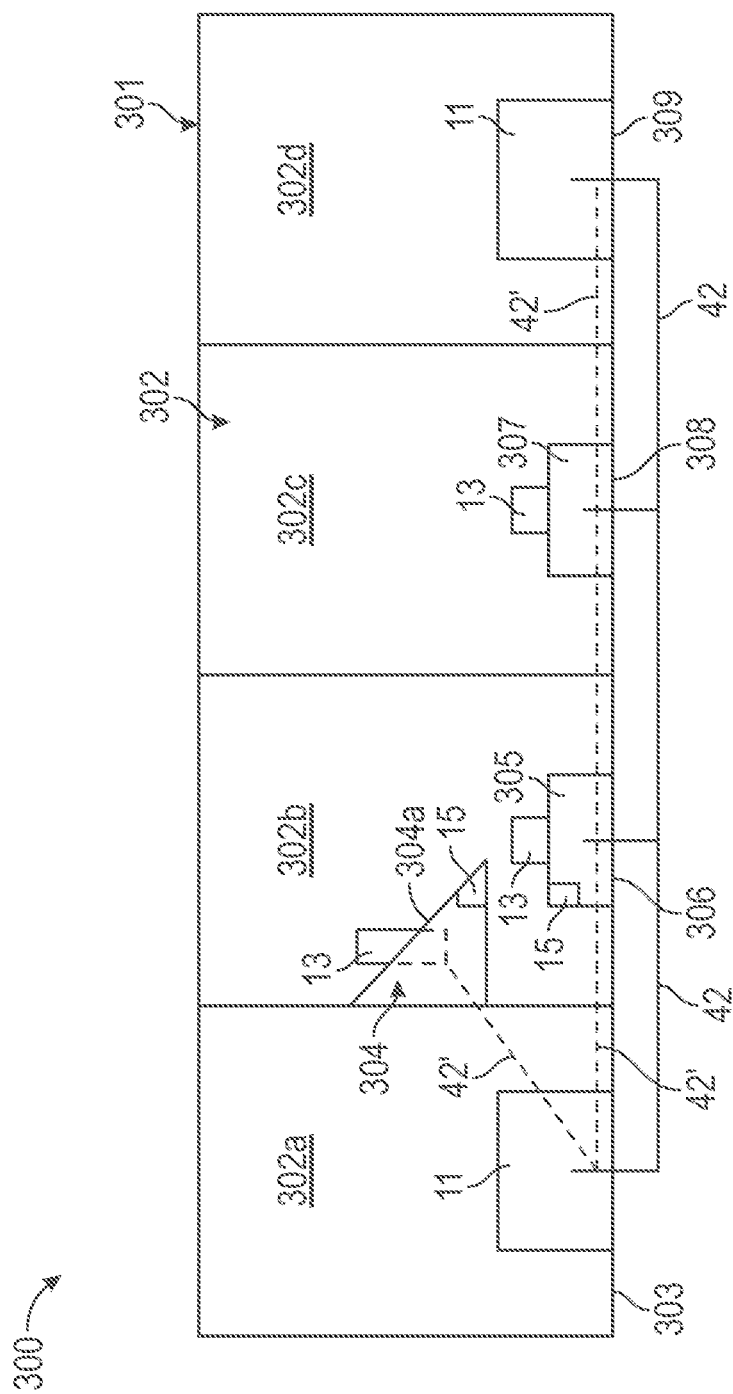
FIG. 10 is a schematic diagram of a vehicle according to an embodiment of the present disclosure.

FIG. 10 is a schematic drawing of a vehicle 300 according to an embodiment of the present disclosure. In an embodiment, the vehicle 300 may be an electric car. In the foregoing embodiment, the vehicle 300 may have an outside support structure or body 301 and an interior space 302 therein. The interior space 302 may be compartmentalized into a plurality of compartmental areas 302a-d. For example, the plurality of areas 302a-d may include a first compartmental area or cargo (frunk) area 302a, a second compartmental area or front passenger area 302b, a third compartmental area or rear passenger area 302c, and a fourth compartmental area or cargo (trunk) area 302d.

In an embodiment, the frunk area 302a may be configured to hold and/or transport cargo and/or a processing assembly 11 configured to be disposed/mounted therein. In embodiments, the frunk area 302a may be configured as an enclosure and may have at least one first interior support structure 303, such as a floor, that can support the processing assembly 11.

In an embodiment, the front passenger area 302b may be configured to seat and/or transport one or more passengers. In an embodiment, the front passenger area 302b may be configured to enable a passenger to operate the vehicle. The front passenger area 302b may have, in an embodiment, a plurality of second interior support structures 304, 305, 306. For example, the second interior support structure 304 may be a dashboard. In another example, the second interior support structure 305 may be a console. In a further example, the second interior support structure 306 may be a floor.

In an embodiment, the dashboard 304 can be configured with a plurality of gauges, such as a speedometer and a fuel meter. The dashboard 304 may be configured with one or more storage areas, such as a glove compartment. The dashboard 304 may be configured with a front panel 304a.

In an embodiment, the dashboard 304 (or specifically the front panel 304a) may support one or more filling assemblies 13. In an embodiment, one or more of the filling assemblies 13 may be mounted on a surface of and/or inside of the dashboard 304 (or specifically the front panel 304a).

In an embodiment, the dashboard 304 (or specifically the front panel 304a) may support a user device 15, such as a computer. In an embodiment, a computer 15 may be mounted on a surface of and/or inside of the dashboard 304 (or specifically the front panel 304a).

In an embodiment, the console 305 can be configured to be disposed adjacent to the dashboard 304 and/or between driver and passenger seats. In an embodiment, the console 305 may be configured with one or more cup holders.

The console 305 may be configured to hold and/or support one or more filling assemblies 13. In an embodiment, one or more filling assemblies 13 can be configured to be disposed on and/or in the console 305 (or specifically a cup holder therein). The console 305 may be further configured to be disposed on the floor 306.

In an embodiment, the console 305 may be configured to hold and/or support a user device 15, such as a computer. In an embodiment, the computer 15 can be configured to be disposed on and/or in the console 305.

In an embodiment, the rear passenger area 302c may be configured to seat and/or transport one or more passengers. The rear passenger area 302c may have, in an embodiment, a plurality of third interior support structures 307, 308. For example, the third interior support structure 307 may be a console that is similar to the console 305. In a further example, the third interior support structure 308 may be a floor.

The console 307 may be configured to hold and/or support one or more filling assemblies 13. In an embodiment, one or more filling assemblies 13 can be configured to be disposed on and/or in the console 307 (or specifically a cup holder therein). The console 307 may be further configured to be disposed on the floor 308.

In an embodiment, the console 307 may be configured to hold and/or support a user device 15, such as a computer. In an embodiment, the computer 15 can be configured to be disposed on and/or in the console 307.

In an embodiment, the trunk area 302d may be configured to hold and/or transport cargo and/or a processing assembly 11 configured to be disposed/mounted therein. In embodiments, the trunk area 302d may be configured as an enclosure and may have at least one fourth interior support structure 309, such as a floor, that can support the processing assembly 11.

Still referring to FIG. 10, a water supply 42 may, in an embodiment, supply water from the one or more processing assemblies 11 and to one or more of the filling assemblies 13. In an embodiment, the water supply 42 may extend from one or more processing assemblies 11 inside of the vehicle 300, then run outside of the vehicle, and then return inside to one or more filling assemblies 13. Alternatively, and/or in addition, a water supply 42' may extend from one or more processing assemblies 11 inside of the vehicle 300 and remain inside to one or more filling assemblies 13.

It should be understood, of course, that the foregoing relates to exemplary embodiments of the disclosure and that modifications may be made without departing from the spirit and scope of the disclosure as set forth in the following claims.

We claim:

1. A vehicular water processing and filling system, comprising:
   a processing assembly configured to condense water from an environment outside of the system;
   wherein the processing assembly is further configured to be disposed in a non-passenger cargo area of a vehicle;
   a filling assembly configured to receive water from the processing assembly and to dispense water into a bottom of a container when the filling assembly holds the bottom of the container;
   wherein the filling assembly is further configured to be disposed in one of a dashboard and a console, both of which are in a passenger area of the vehicle; and
   a controller configured to:
      be disposed in one of the cargo and passenger areas of the vehicle;
      identify a presence of the container operatively adjacent to the filling assembly;
      after identifying, determine whether an RFID tag on the container is valid;
      after determining that the RFID tag is valid, obtain physical characteristics of the container, including type of the container and empty weight of the container;
      after obtaining, display instructions to a user of the system to place the container in the filling assembly;
      after displaying, determining if a weight of the container is within a valid weight range;
      after determining if the weight is within the valid weight range, activate a valve in the filling assembly;
      after activating, flow water from the filling assembly and into the container; and
      after flowing, determine whether the container is full of water, and if the determination is "no", determine whether the container has been removed from the filling assembly.

2. The system of claim 1, wherein the controller is further configured to:
   determine whether an RFID tag on the container is valid;
   if the RFID tag is not valid, display to the user an invalid RFID tag message;
   if the RFID tag is valid, obtain user information;
   after obtaining, determine if there is a valid user account;
   if there is no valid user account, enable the user to set up an account;
   if there is a valid user account, enable the user to purchase a fill of the container.

3. The system of claim 1, wherein the controller is further configured to cause a load cell in the filling assembly to measure the weight of the container.

4. The system of claim 1, wherein the controller is further configured to compare the weight of the container, prior to receiving water, with the valid weight range.

* * * * *